United States Patent
Klaar

[11] 3,894,138
[45] July 8, 1975

[54] APPARATUS FOR MEASURING COOLANT LEAKAGE IN ELECTRICAL POWER GENERATING MACHINES

[75] Inventor: Jürgen Klaar, Mulheim-Ruhr, Germany

[73] Assignee: Kraftwerk Union Aktiengesellschaft, Mulheim-Ruhr, Germany

[22] Filed: Mar. 12, 1974

[21] Appl. No.: 450,481

Related U.S. Application Data
[63] Continuation of Ser. No. 304,260, Nov. 6, 1972, abandoned.

[30] Foreign Application Priority Data
Nov. 5, 1971 Germany............................ 2159979

[52] U.S. Cl. ..................... 310/53; 310/55; 310/56
[51] Int. Cl. ............................................ H02k 9/24
[58] Field of Search ................................ 310/52–65

[56] References Cited
UNITED STATES PATENTS

| | | | |
|---|---|---|---|
| 2,675,493 | 4/1954 | Grobel | 310/53 |
| 2,970,232 | 1/1961 | Kilbourne | 310/53 X |
| 2,988,656 | 6/1961 | Grobel | 310/53 |
| 3,122,668 | 2/1964 | Cuny | 310/53 |
| 3,240,967 | 3/1966 | Krastchew | 310/55 X |
| 3,258,619 | 6/1966 | Davidson | 310/55 X |

*Primary Examiner*—Donovan F. Duggan
*Attorney, Agent, or Firm*—Herbert L. Lerner

[57] ABSTRACT

In an electrical power generating machine employing several coolant streams employing a water stream to cool the stator and a gaseous stream for cooling the machine housing. One of the two coolants is supplied with a coolant leakage indicating medium such as helium or tritium, such that, the presence of a coolant leak is ascertained by the passage of the leakage indicating medium from one coolant stream to another and is thereafter detected. A measuring device such as an iostope counter, is employed to measure the amount of indicating medium that is transferred due to leakage.

9 Claims, 4 Drawing Figures

APPARATUS FOR MEASURING COOLANT LEAKAGE IN ELECTRICAL POWER GENERATING MACHINES

This is a continuation of application Ser. No. 304,206, filed Nov. 6, 1972, now abandoned.

The present invention is directed to a method and apparatus for use in a cooling water cycle of electrical power generating machines, such as turbo generators. More particularly, the present invention is employed where, for example, at least the stator is water cooled and gaseous coolant is employed within a pressure-tight machine housing; in turn, one of the two coolants is supplied with a leakage indicating medium in the form of helium or tritium. Once a coolant leakage occurs its presence is determined and is measured by the passage of the leakage indicating medium into the second coolant stream.

In power generating machines of high capacity, such as turbo generators, the removal of heat generated by losses from the stator, as well as, the rotor, is effected by water-cooling of the appropriate winding conductor. However, with such water cooling, there is danger, that when water leakage occurs and is not detected in time, considerable damage can occur in the cooling water cycle within the machine housing.

The prior art has attempted to detect such leakage and the escaping water by measuring the moisture in the cooling gas flow. However, in the case of small leaks, measurable losses are difficult to ascertain since the amount of moisture which appears within the cooling gas stream in the machine housing is extremely small. Furthermore, since this moisture precipitates very quickly at the coolers for the protective gas in the machine housing, a measureable rise in the moisture content within the cooling gas flow is not available.

The principle object of the present invention is to provide a method and apparatus to determine and measure water loss due to leakage in a power generating machine housing.

Another object of the present invention is to provide a method and apparatus adapted to quickly ascertain leakage points in a cooling water cycle within a power generating machine housing.

Still another object of the present invention is to provide a method and apparatus for detecting small leaks in the cooling water cycle within the machine housing.

With the foregoing and other objects in view, there is provided, in accordance with the invention, a method of detecting coolant leakage in a cooling water cycle of an electrical power generating machine, provided with a pressure tight housing and a stator disposed therein, including the steps of: charging a water coolant stream into conduits surrounding said stator; introducing a gaseous coolant stream into said machine housing; supplying one of said respective coolants with a leakage indicating medium, said indicating medium being adapted to migrate into the other coolant stream upon the occurrence of coolant leakage; and measuring the amount of said indicating medium transferred in response to coolant leakage.

It has been discovered, that if an indicating medium is added to the stream of one of the two coolants employed in the power generating machine housing, upon the occurrence of a water coolant leakage such indicating medium will transfer or pass into the other coolant stream and is thereafter measured. Helium or even a radio-active iostope in form of tritium can be employed as an indicating medium. It is advantageous to add the indicating medium to a first coolant which has a higher operating pressure when compared to that of the second coolant.

With the aforementioned development, if a leakage appears, it is possible for the indicating medium added to the first coolant to pass into the other coolant stream, which up to that point in time, is free of the indicating medium. Once this has taken place, detection and measurement at a respective measuring location can take place. In accordance with the above, indicators being employed enable detection of the indicating medium in the smallest amounts, so that even very small leaks can be easily and readily detected.

To carry out the detection and measuring in an electrical power generating machine with at least a water cooled stator and a hydrogen coolant flow in the housing operating at a higher pressure than that of the cooling water; the present invention contemplates providing at the machine housing, a supply device for feeding a gas, for example, helium, into the hydrogen cooling gas and providing an expansion vessel for the cooling water. A helium leakage testing-device detects helium that has transferred into the cooling water. In this case, since the hydrogen cooling stream is operational at a pressure higher than that the cooling water, a leakage will cause hydrogen gas to transfer into the cooling water, so that the helium contained in the hydrogen gas will also transfer into the cooling water and thus can be detected.

A further development along these lines, especially at high operational pressures when employing hydrogen cooling gas, for that matter even hydrogen gas pressures as well, contemplates connecting to the cooling-water supply, a tritium feed-in device and to the machine housing an exhaust pipe for a partial stream of the hydrogen coolant gas. An isotope counter is employed as the measuring device. Thus, when a leakage occurs, the tritium contained in the water will also escape into the cooling gas where it will produce a very low radio activity in the cooling gas which in turn is easily measured with an appropriate counter.

In a machine employing water-cooled stators and rotors as well as, a bi-laterally evacuated air gap having a protective gas blanket within the housing (for example an earth gas atmosphere) it is preferable to connect to the coolant water inlet line, an inlet device for the indicator; and to connect an exhaust pipe for a partial stream of the protective gas to the machine housing. Another exhaust pipe with a measuring device is connected parallel to a vacuum pump for the air gap. Each exhaust pipe is employed for detecting the transferred indicating medium. From the above, it therefore is possible to add helium, as well as, tritium, to the cooling water.

Other features which are considered as characteristic for the invention are set forth in the appended claims.

Although the invention is illustrated and described herein as embodied in a method and apparatus for coolant detection, it is nevertheless not intended to be limited to the details shown, since various modifications and structural changes may be made therein without departing from the spirit of the invention and within the scope and range of equivalents of the claims.

The construction and method of operation of the invention however, together with additional objects and advantages thereof will be best understood from the following description of specific embodiments when read in connection with the accompanying drawing in which.

Figure 1:
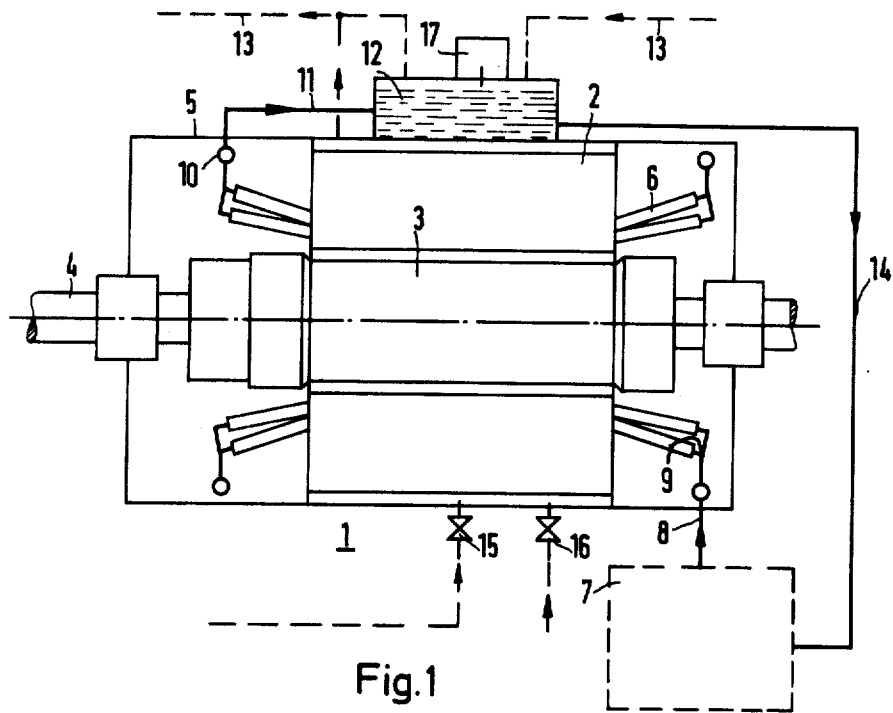
FIG. 1 is schematic representation of an electrical power generating machine with water cooled stator employing a hydrogen coolant flow within the housing and arranged to use helium as the indicating medium.

Referring now to the drawing and particularly to FIG. 1 the electrical machine 1 comprises a water-cooled stator 2 and a gas-cooled rotor 3 which is driven by a turbine (not shown in detail). Stator 2 and rotor 3 are enclosed by a pressure- and gas-tight housing 5. The stator winding 6 is for example, cooled by cooling water, for the removal of heat generated by losses. This cooling water is supplied from a water-treatment installation 7 via a line 8, to a ring main 9 whence the individual hollow conductors of the stator winding 6 are charged with the cooling water. On the other side of the stator, the water flowing off the winding 6 is guided through a ring main 10 and a discharge 11, into the cooling water expansion vessel 12, which is arranged above the machine 1. Through this expansion vessel 12, hydrogen or nitrogen is passed at a constant pressure through line 13 in order to saturate any excess water, having dissolved oxygen, with such hydrogen or nitrogen. From this expansion vessel 12, the cooling water is subsequently returned, via line 14, to a water-treatment plant which includes: coolers, pumps, etc. and in turn is passed from there once again into the cooling of the stator winding 6.

Within the housing 5, hydrogen gas is also fed-in via a line 15, in order to obtain the necessary coolant gas flow for adequate cooling of the stack of stator laminations, as well as, for the rotor of the machine. For illustrative purposes, it is assumed that the hydrogen gas within the housing 5 has a higher pressure than the cooling water in the stator winding 6, and in the respective inlets.

In order to detect early leakage in the cooling water cycle within the housing 5, the housing 5 is connected to an additional inlet line 16, through which helium can be supplied as an indicating medium. It follows, if leakage occurs in the cooling water cycle, then the higher pressure of the hydrogen within the housing, will cause a portion of this hydrogen with the helium contained therein, to pass into the cooling water. In order to determine whether helium is transferred into the cooling water, a helium leakage device 17 is connected, for example to the water-expansion vessel 12. Furthermore, device 17 can also reliably detect slight traces of helium in the cooling water. In this manner, the appearance of a leak can be detected very early, so that severe damage to the machine can be avoided through timely action.

Figure 2:
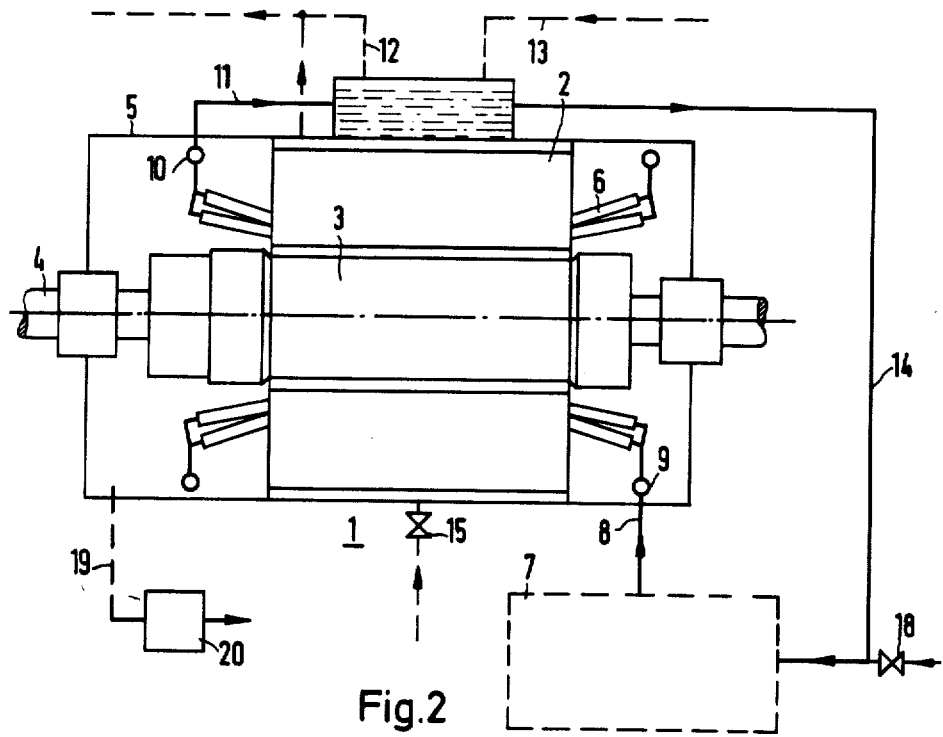
FIG. 2 is the machine of FIG. 1 with tritium added to the cooling water and employed as the indicating medium.

In FIG. 2, the same machine with a water-cooled stator is shown as in FIG. 1, except in this instance, it is assumed that the pressure of the hydrogen gas within the housing 5, is lower than the pressure of the cooling water in the stator winding 6. In such a situation it is preferable to add the indicating medium to the cooling water itself. To this end, the cooling water line 14 is connected to a feed-in device 18 for supplying tritium to the cooling water. However, the supply of tritium can be introduced at any other arbitrary point within the cooling water cycle. When a leakage in the cooling water cycle occurs, the water and the tritium contained therein, enter into the hydrogen gas within the housing 5 which thereby produces a slight radioactivity in the hydrogen gas. In order to determine this radio activity, the housing 5 is connected to an exhaust pipe 19 for a partial stream of the hydrogen gas. An insotope counter 20 is connected to exhaust pipe 19 which, upon the occurrence of coolant leakage, and, thus, a radio-activity in the hydrogen gas, immediately releases an appropriate indication. This arrangement also enables a quick and reliable indication of even small amounts of leakage; i.e. a water loss of only 1 liter per day.

The introduction of indicating medium in form of tritium into the cooling water is also possible in the installation described in FIG. 2, if the hydrogen gas in housing 5 has a higher pressure than the cooling water in the cooling cycle; here too, when leakage occurs, the tritium will transfer into the hydrogen gas.

Figure 3:
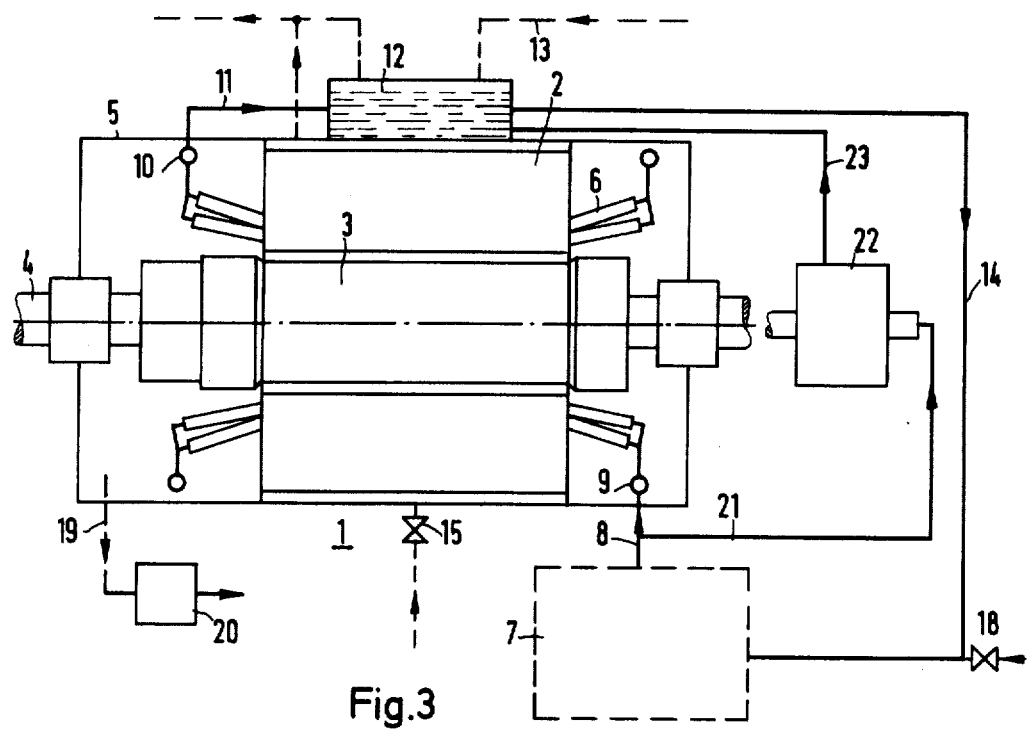
FIG. 3 is a schematic representation of an electrical power generating machine employing a water cooled stator and rotor with tritium as the indicating medium.

The embodiment illustrated in FIG. 3 relates to a power generating machine having a water-cooled stator and rotor. Cooling water is supplied and the cooling of the stator is effected in the manner described in FIGS. 1 and 2. For the purpose of cooling the rotor, however, a portion of the cooling water is introduced into the rotor shaft 4, via a branch line 21. After passing the rotor winding, cooling water is again removed from the rotor via the water-connection head 22 (only schematically illustrated) and introduced through another line 23, into the water-expansion vessel 12. Here it is mixed with the stator cooling water, which is supplied, via a feed-in device 18, with tritium which then flows evenly with the cooling water through the stator- and the rotor winding of the machine. When leakage from the water-cooled winding occurs, the water transfers with the tritium into the hydrogen gas within the housing 5. This can be supplied with an exhaust pipe 19 to an isotope counter 20 which will indicate activity in the hydrogen gas.

Figure 4:
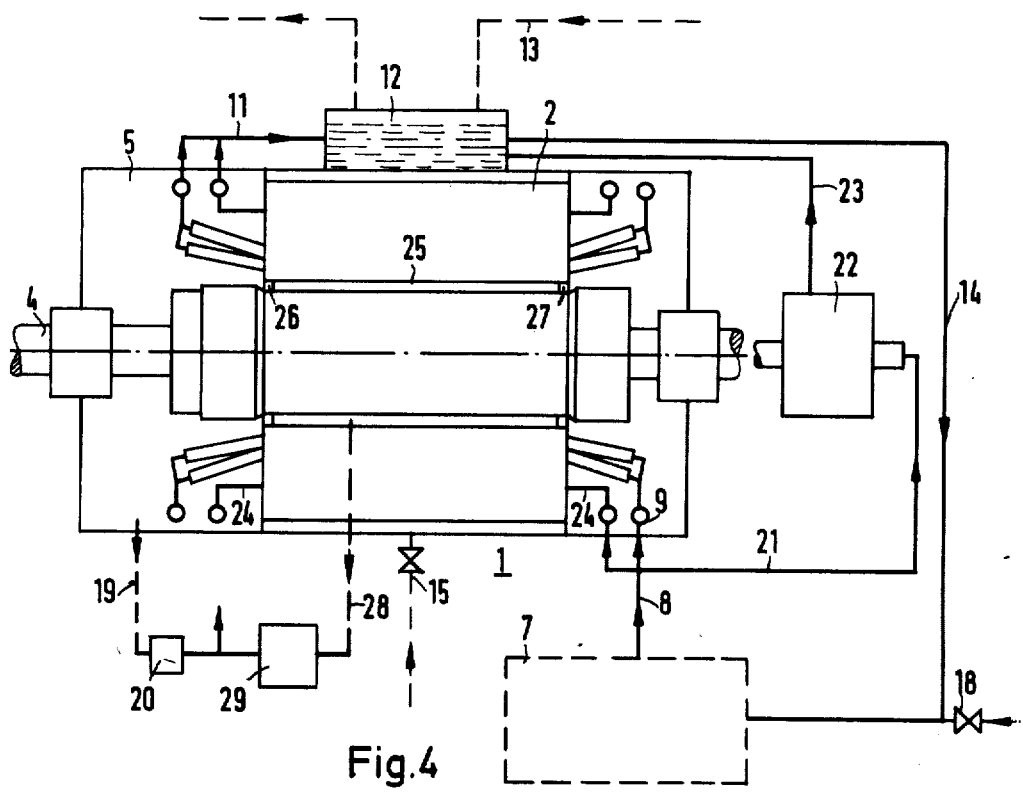
FIG. 4 is the machine of FIG. 3 with an evacuated air gap, which uses helium or tritium as the indicating medium in the cooling water.

The embodiment according to FIG. 4 relates to a power generating machine having a water-cooled stator and rotor, where the stack of stator laminations is also water-cooled through the cooling water lines 24. In addition, in order to reduce the friction losses, air gap 25 of the machine is evacuated. For this reason, a sealing of the air gap is required through the seals 26 and 27 (only schematically shown) at both ends of the air gap 25. Since the stack of stator laminations does not have to be cooled with gas and, no friction losses occur through the cooling gas in the air gap 25, it is sufficient to provide the inside of the housing 5, only with a protective gas, for example, in form of an earth gas. In the embodiment example shown here, a supply of indicating medium to the cooling water cycle is effected through the feed-in device 18. By this arrangement, it is possible to feed helium as well as tritium, into the cooling water. To indicate the occurrence of leakage an additional exhaust pipe 28 (not shown in detail) is provided in parallel to the vacuum pump in addition to the exhaust 19 with a measuring device 20 described in FIGS. 2 and 3. Such exhaust pipe 28 leads from the air gap 25, into housing 5. In this exhaust pipe 28, too, an appropriate measuring device 29 is connected in the form of an isotope counter, when tritium is used as the indicating medium or a helium leakage device when helium is used as the indicating medium. The measuring device 20 reliably detects the presence of indicating medium transferred from the cooling cycle into the protective gas atmosphere; whereas, the indicating medium within the housing which emerges into the air gap, reliably identifies the presence of leakage via measuring device 29.

I claim:

1. Device for detecting cooling water leakage in the cooling water cycle of turbogenerators which are cooled by water in the stator and the rotor and are provided with additional cooling by hydrogen gas within the housing of said turbogenerator, comprising inlet means for introducing tritium into the water in the cooling water cycle, discharge means connected to said housing for withdrawal of a portion of hydrogen contained in the housing, an isotope measuring device connected to said discharge means to measure tritium which during a leakage penetrates from said cooling water cycle into said hydrogen gas contained in said housing.

2. Device as claimed in claim 1, wherein said turbogenerator has a bilaterally sealed, evacuated air gap between said stator and said rotor, and wherein exhaust means are connected to said air gap, and an isotope measuring device connected to said exhaust means for determining tritium which penetrates into said air gap and passes through said exhaust means into said isotope measuring device.

3. Device as claimed in claim 2 wherein said exhaust means and said discharge means are connected in parallel relationship to vacuum pump means.

4. An apparatus adapted to detect the presence of a coolant leakage in the cooling water cycle of an electrical power generating machine, said machine including a machine housing; a stator disposed in said housing; a first inlet means connected to said housing, adapted to introduce a coolant hydrogen gas stream under pressure into said housing, said machine housing having first exhaust means for introducing a controlled amount of said hydrogen coolant stream into an isotope counter; additional inlet means for introducing tritium; water coolant supply means connected to the additional inlet means; conduit means surrounding said stator providing passage for a supply of water coolant from the water coolant supply means at a pressure lower than said hydrogen gas stream, sufficient to cool said stator; a second inlet means connected to said housing adapted to introduce helium into said hydrogen gas stream; an expansion vessel means adapted to receive water coolant; and a coolant leakage measuring apparatus, said measuring apparatus being responsive to the presence of helium gas transferred into said water coolant stream.

5. An apparatus adapted to detect the presence of a coolant leakage in the cooling water cycle of an electrical power generating machine, said machine including a machine housing bi-laterally sealed and having a protective atmosphere therein; a stator disposed in said housing; a rotor disposed in said housing; water coolant supply means; a first inlet means connected to said housing, adapted to introduce a coolant hydrogen gas stream under pressure into said housing; conduit means surrounding said stator and said rotor providing passage for supply of water coolant from the water coolant supply means at a pressure lower than said hydrogen gas stream, sufficient to cool said stator and said rotor; a second inlet means connected to said housing adapted to introduce helium into said hydrogen gas stream; an expansion vessel means adapted to receive water coolant; exhaust means provided with means for ascertaining an amount of coolant leakage from the respective coolant streams; vacuum pump means connected to said exhaust means and in parallel relationship with an evacuated air gap in said housing; and a coolant leakage measuring apparatus, said measuring apparatus being responsive to the presence of helium gas transferred into said coolant stream.

6. An apparatus as claimed in claim 5, further comprising a rotor disposed in said housing, and wherein the conduit means surrounds the rotor and provides water coolant sufficient to cool said rotor.

7. Device for detecting cooling water leakage in the cooling water cycle of turbogenerators which are cooled by water in the stator and are provided with additional cooling by hydrogen gas within the housing of said turbogenerator, comprising inlet means for introducing tritium into the water in the cooling water cycle, discharge means connected to said housing for withdrawal of a portion of hydrogen contained in the housing, an isotope measuring device connected to said discharge means to measure tritium which during a leakage penetrates from said cooling water cycle into said hydrogen gas contained in said housing.

8. An apparatus adapted to detect the presence of a coolant leakage in the cooling water cycle of an electrical power generating machine, said machine including a machine housing; a stator disposed in said housing; a first inlet means connected to said housing, adapted to introduce a coolant hydrogen gas stream under pressure into said housing; a second inlet means connected to said housing adapted to introduce tritium into said hydrogen gas; water coolant supply means; conduit means surrounding said stator providing passage for a supply of water coolant from the water coolant supply means at a pressure lower than said hydrogen gas stream, sufficient to cool said stator; an expansion vessel means adapted to receive water coolant; exhaust means for the discharge of gas from said expansion vessel; an isotope measuring device connected to said exhaust means to measure tritium in said gas from said expansion vessel.

9. Apparatus as claimed in claim 8 wherein said housing also contains a rotor with conduit means for passage of water coolant.

* * * * *

UNITED STATES PATENT AND TRADEMARK OFFICE
CERTIFICATE OF CORRECTION

PATENT NO. : 3,894,138
DATED : July 8, 1975
INVENTOR(S) : Jürgen Klaar

It is certified that error appears in the above-identified patent and that said Letters Patent are hereby corrected as shown below:

In the heading the Foreign Priority Number should read -- 2154979 -- instead of "2159979".

Signed and Sealed this ninth Day of March 1976

[SEAL]

Attest:

RUTH C. MASON
*Attesting Officer*

C. MARSHALL DANN
*Commissioner of Patents and Trademarks*